United States Patent [19]

Arvanitakis

[11] Patent Number: 5,047,123
[45] Date of Patent: Sep. 10, 1991

[54] APPARATUS FOR CLARIFYING LIQUIDS

[75] Inventor: Kostas S. Arvanitakis, Orland Park, Ill.

[73] Assignee: Hydro-Tek, Inc., Mokena, Ill.

[21] Appl. No.: 364,330

[22] Filed: Jun. 9, 1989

[51] Int. Cl.$^5$ ............................ B01D 1/00; B01D 3/00
[52] U.S. Cl. ........................................ 202/170; 8/158; 34/11; 34/73; 68/18 C; 68/18 F; 159/25.1; 202/175; 202/265; 210/193; 210/334; 210/456; 210/777; 366/310
[58] Field of Search ............... 202/170, 175, 265; 203/1, 14, 99; 159/25.1, DIG. 32, 43.2; 366/310; 34/11, 73, 79; 8/158; 210/193, 334, 456, 777; 68/18 F, 18 C

[56] References Cited

U.S. PATENT DOCUMENTS

| | | | |
|---|---|---|---|
| 1,466,535 | 8/1923 | Kyrides | 202/175 |
| 3,672,958 | 6/1972 | McCandlish | 202/175 |
| 3,725,205 | 4/1973 | Heen | 202/175 |
| 3,739,710 | 6/1973 | Costa et al. | 159/25.2 |
| 3,751,010 | 8/1973 | Latinen | 159/25.1 |
| 3,957,588 | 5/1976 | Humiston | 202/175 |
| 3,997,406 | 12/1976 | Arvanitakis | 159/25.1 |
| 4,279,704 | 7/1981 | Noble, Sr. et al. | 202/175 |
| 4,470,998 | 9/1984 | Paget | 202/175 |
| 4,778,605 | 10/1988 | Anthoney et al. | 202/175 |
| 4,879,888 | 11/1989 | Suissa | 202/170 |
| 4,885,099 | 12/1989 | Kelly | 202/170 |

Primary Examiner—Virginia Manoharan
Attorney, Agent, or Firm—Leydig, Voit & Mayer

[57] ABSTRACT

A system for clarifying liquids, having particular utility in dry cleaning operations. The system includes a filter apparatus which includes a plurality of axially spaced filter elements each having a high pressure side through which unclarified liquid is directed and upon which solids in the unclarified liquid accumulate and a low pressure side in communication with a liquid outlet of the filter apparatus. A liquid agitating impeller is disposed between respective adjacent pairs of the filter elements for defining a predetermined spacing between the filter elements and for creating liquid turbulence and agitation between the filter elements in response to rotation of a common shaft upon which the filter elements and impellers are mounted for effecting substantially complete removal of accumulated solids on the high pressure sides of the filter elements without movement between the impellers and filter elements. The dislodged solids and an isolated quantity of the liquid are directable into a still for vaporizing and condensing the liquid while leaving the solids within the still for disposal. The still includes an auger adapted for alternately moving the contents within the still in opposite axial direction, while simultaneously alternately lifting the contents upwardly against opposite sides of the still for enhancing heating and vaporization of the liquid and ultimate drying of the remaining solids.

14 Claims, 6 Drawing Sheets

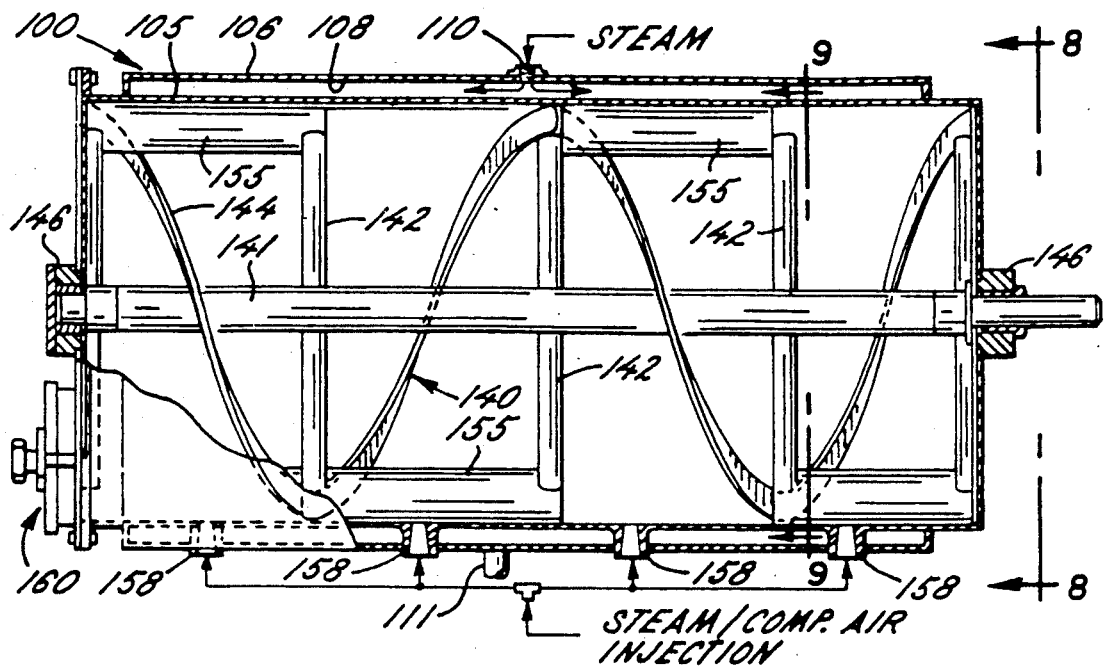
FIG. 7
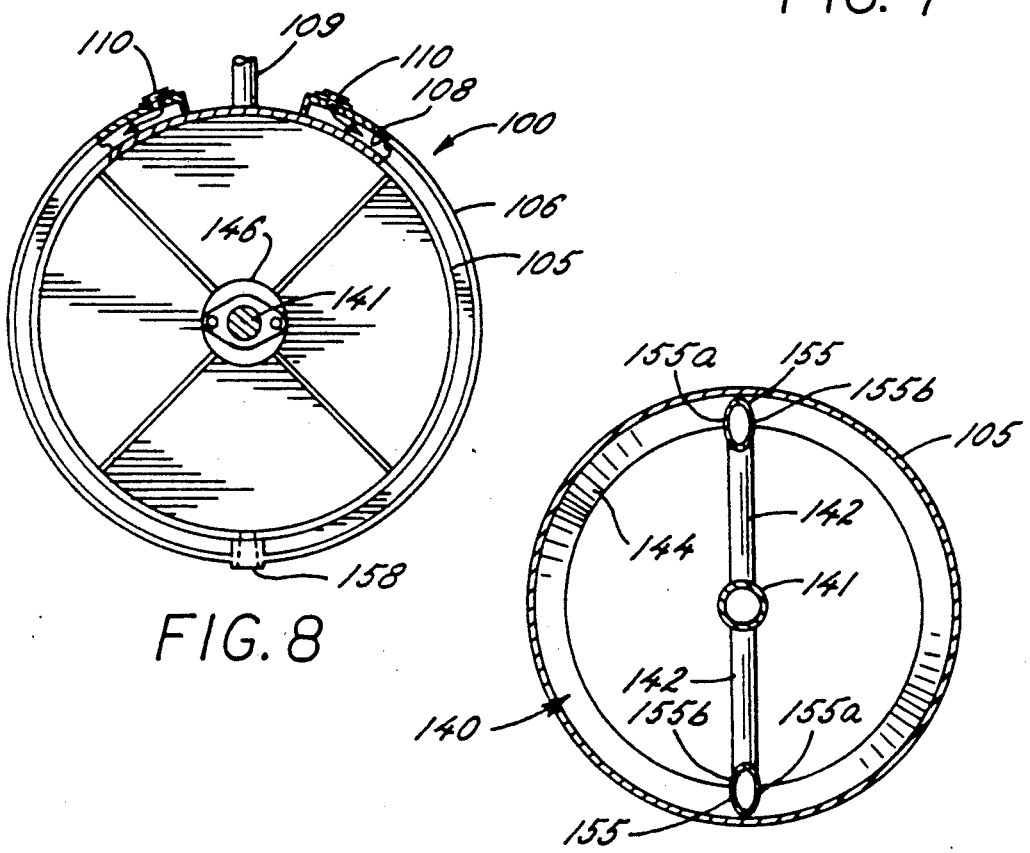
FIG. 8
FIG. 9

APPARATUS FOR CLARIFYING LIQUIDS

FIELD OF THE INVENTION

The present invention relates generally to a method and apparatus for clarifying liquids through pressure filtration, and more particularly, to a method and apparatus wherein a filter-aid deposited on the filter, together with accumulated solids, are intermittently dislodged from the filter and ultimately removed from the system.

BACKGROUND OF THE INVENTION

Many industrial and commercial operations utilize filter apparatus for clarifying liquids. In dry cleaning operations, for example, solvents, such as perchloroethylene and trichlorethylene, are used in order to remove solid particles, such as lint, dirt, and chemical contaminants from soiled clothing. Since the solvents are relatively expensive, such commercial dry cleaning operations utilize filter apparatus in conjunction with the dry cleaning machine for removing the solids and chemical impurities from the dry cleaning solvents in order to permit reuse of the solvents.

Two different types of filter apparatus commonly are used in commercial and industrial dry cleaning operations. One type is a replaceable cartridge filter which contains a pleated paper-type filter medium for physically removing solid materials and a filter core of granulated activated charcoal for adsorbing chemical impurities. A disadvantage of cartridge filters is that as solid materials accumulate on and clog the filter, the efficiency of the filter is irreversibly impaired. The dry cleaning machine eventually must be shut down and the cartridge removed and replaced with a new one. Not only are the cartridges relatively expensive, but upon removal, they contain up to a gallon or more of solvent, which is wasted. Moreover, since the solvent is toxic, it is deemed a hazardous waste which necessitates governmental regulated disposal of the cartridge. The cost of the wasted solvent, together with the cost of disposal, typically approximates the initial cost of the cartridge filter.

Another type of filter apparatus commonly used in commercial and industrial dry cleaning operations is a reusable pre-coat filter, which includes mechanical filters made of stainless steel mesh or fine mesh synthetic fabric filter cloth such as nylon, polyester, or the like, and involves depositing filter-aid powder, such as diatomaceous earth, onto the filter to form a filter cake of the desired porosity. Pulverized activated carbon also can be mixed with the filter-aid for adsorbing chemical impurities in the solvent. After solids from the unclarified solvent accumulate on and clog the surface of the filter, the accumulated solids and filter-aid may be dislodged from and reapplied to the filter so as to again render the filter cake porous. As solids build up in the system after prolonged operation of the dry cleaning system, however, the solids and other contaminants ultimately must be separated from the solvent so as to permit reuse of the solvent with a new charge of filter-aid.

Heretofore, problems have been incurred in effectively removing the accumulated solids and filter cake from pre-coat filters without damage to the filter and without time-consuming delays in operation of the dry cleaning system. When brushes or scrapers have been utilized for physically scraping or brushing the accumulated solids and filter-aid from filter surfaces, such as fine mesh stainless steel screens, damage, puncturing, or undesirable wear to the screen can result. When more delicate filter surface materials are employed, such as fine mesh synthetic fabric filter cloth, physical brushing or scraping cannot be used. Efforts to remove the filter-aid and accumulated solids from the filters without brushing or scraping often do not result in complete removal of the accumulated solids and filter-aid. Residue remaining on the filter, and particularly slimy residue, tends to impede liquid flow through the filter which is necessary for reestablishing a uniform filter cake on the filter for subsequent operation.

Further problems have been incurred in the eventual removal of the solids from the system so as to permit reuse of the solvent with a new charge of filter-aid. Prior separation and removal methods employed for such purpose often have been inefficient and result in sludges with relatively high solvent contents, which create strong, unpleasant odors and necessitate disposal of the sludge as a hazardous waste material. In an effort to reduce the solvent content in sludges produced in distillation processes, it is known to introduce steam into the distillation vessel during the final stages of distillation, subsequently condense the water and solvent vapors generated, and then separate the condensed water and solvent. The disadvantage of such procedure, commonly referred to as a steam sweep, is that substantial quantities of water can be generated, which even after the separation step, can contain sufficiently high amounts of solvent as to render the liquid toxic and disposable only as a hazardous waste material.

OBJECTS AND SUMMARY OF THE INVENTION

It is an object of the present invention to provide an improved method and apparatus for clarifying liquids employing pre-coat filters.

Another object is to provide a method and apparatus as characterized above which is adapted for thorough and substantially complete removal of accumulated solids and filter cake from the filter apparatus without damage or wear to the filter media.

A further object is to provide a liquid clarification method and apparatus that may utilize delicate fine mesh filter media with such small porosity as to eliminate the need for the addition of filter aid materials.

Yet another object is to provide a method and apparatus of the foregoing type which permits efficient, substantially complete separation and removal of solids and other impurities from used dry cleaning solvents, permitting reuse of the solvent and leaving the removed solids in dry powder form, substantially free of retained solvents, which may be disposed of through normal channels.

Still a further object is to provide a method and apparatus of the above kind which permits substantially complete removal of retained solvents from sludges produced during distillation without generating large quantities of solvent contaminated water that must be disposed of as a hazardous waste material.

Another object is to provide such a method and apparatus which effects automatic removal of the separated solids from the distillation vessel.

Other objects and advantages of the invention will become apparent upon reading the following detailed

BRIEF DESCRIPTION OF THE DRAWING

FIG. 7 is a longitudinal section of the still of the illustrated liquid clarification system;

FIG. 8 is an end view of the still, in partial section taken into plane of line 8—8 in FIG. 7; and FIG. 9 is a vertical section of the still taken in the plane of line 9—9 in FIG. 7.

Figure 1:
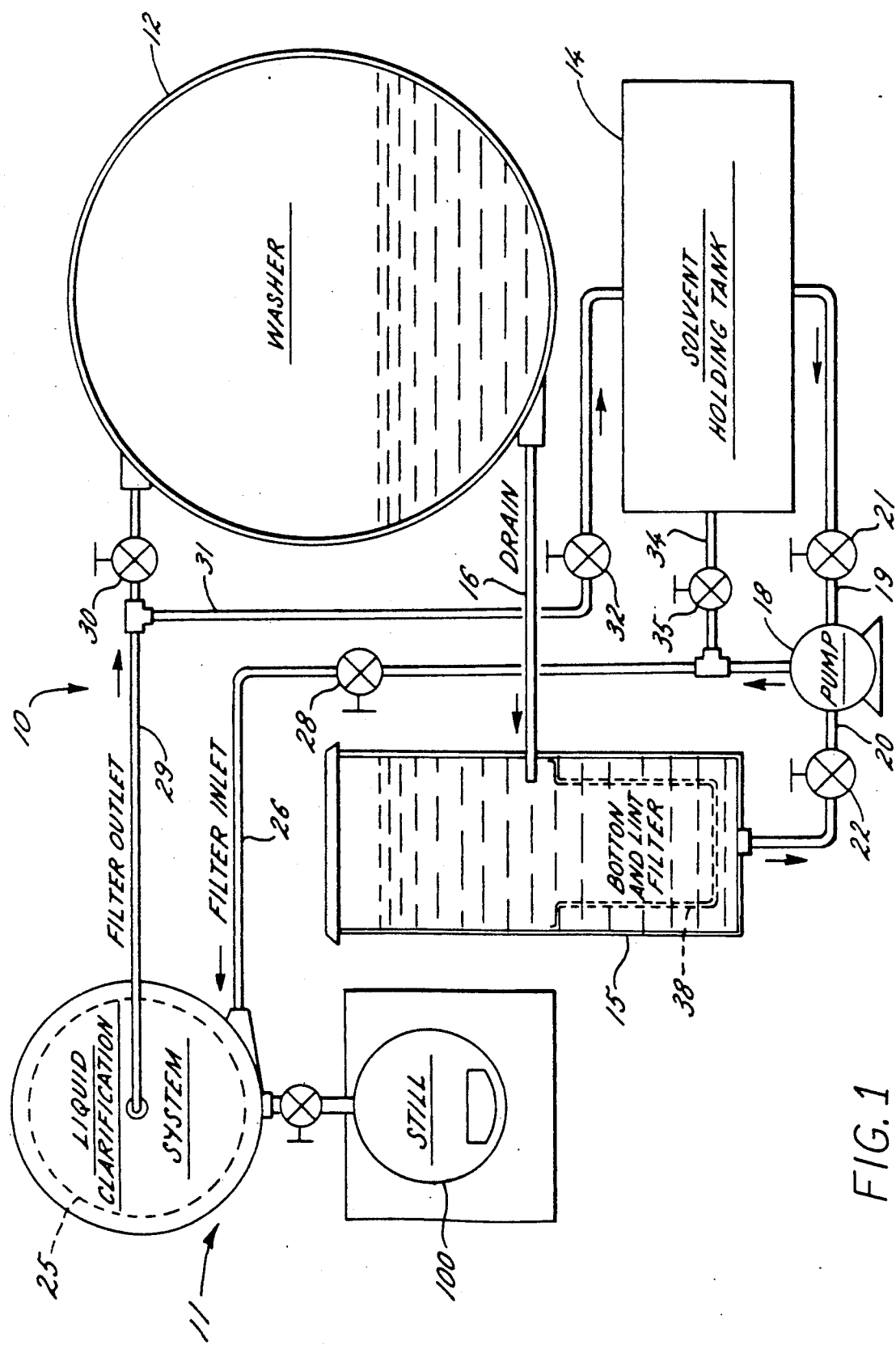
FIG. 1 is a diagrammatic illustration of an illustrative dry cleaning system having a liquid clarification system in accordance with the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Referring now more particularly to FIG. 1 of the drawings, there is shown an illustrative dry cleaning system 10 having an associated liquid clarification system 11 in accordance with the present invention. The dry cleaning system 10 includes a washer 12, within which soiled clothes or other items to be dry-cleaned are deposited, a solvent holding tank 14, and a button and lint filter 15, all of which may be of a conventional type. The washer 12 has a drain 16 in communication with the button and lint filter 15, and the solvent holding tank 14 and button and lint filter 15 both are connected to a pump 18 through outlet lines 19, 20 which are controlled by respective valves 21, 22. The pump 18 is connected to a filter apparatus 25 of the liquid clarification system 11 by a line 26 having a control valve 28, and the filter apparatus 25 in turn is connected to the washer 12 through a line 29 having a control valve 30. A bypass line 31 having a control valve 32 is connected between the washer supply line 29 and the solvent holding tank 14. A second by-pass line 34 having a control valve 35 is connected between the filter supply line 26 and the solvent holding tank 14.

For circulating solvent through the washer 12 during a dry cleaning operation, upon appropriate control of valves 21, 22, 28, 30, 32, and 35, as is known in the art, operation of the pump 18 will direct solvent from the holding tank 14 to the filter apparatus 25 through lines 19, 26, and in turn, from the filter apparatus 25 to the washer 12 through the line 29. Solvent will flow from the washer 12 to the button filter 15 through the drain 16 and then return to the pump 18 through line 20 for recirculation through the filter apparatus 25 and washer 12. Since the washer 12 communicates with the button and lint filter 15 through the drain 16, the level of solvent in the button and lint filter 15 is the same as in the washer 12. The button and lint filter 15 has a screen 38, which may be basket-shaped, for collecting buttons and other relatively large solids in the unclarified solvent flow stream discharging from the washer drain 16.

Figure 2:
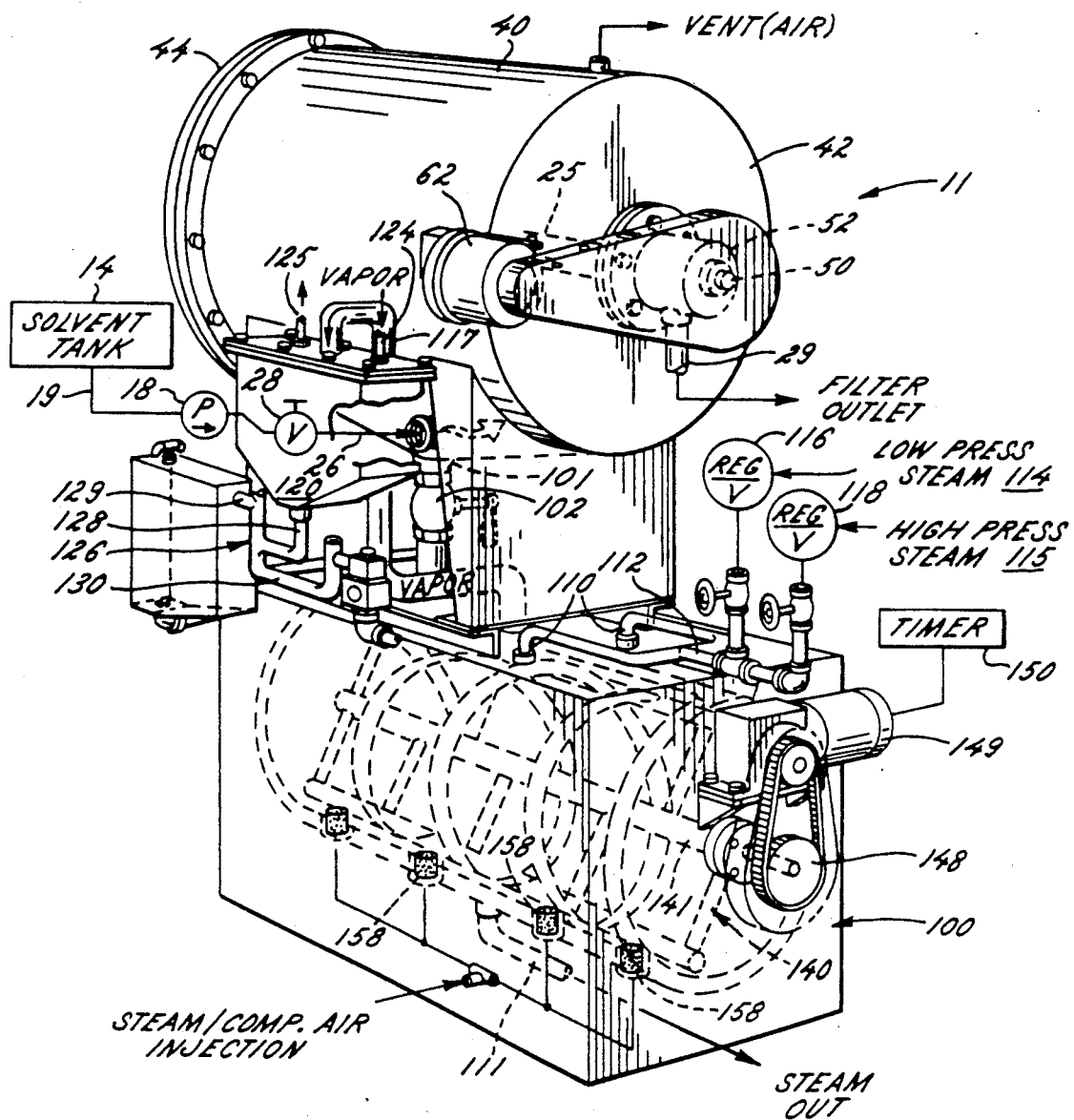
FIG. 2 is a perspective showing a front side and one end of the filter apparatus and still of the illustrated liquid clarification system.
Figure 3:
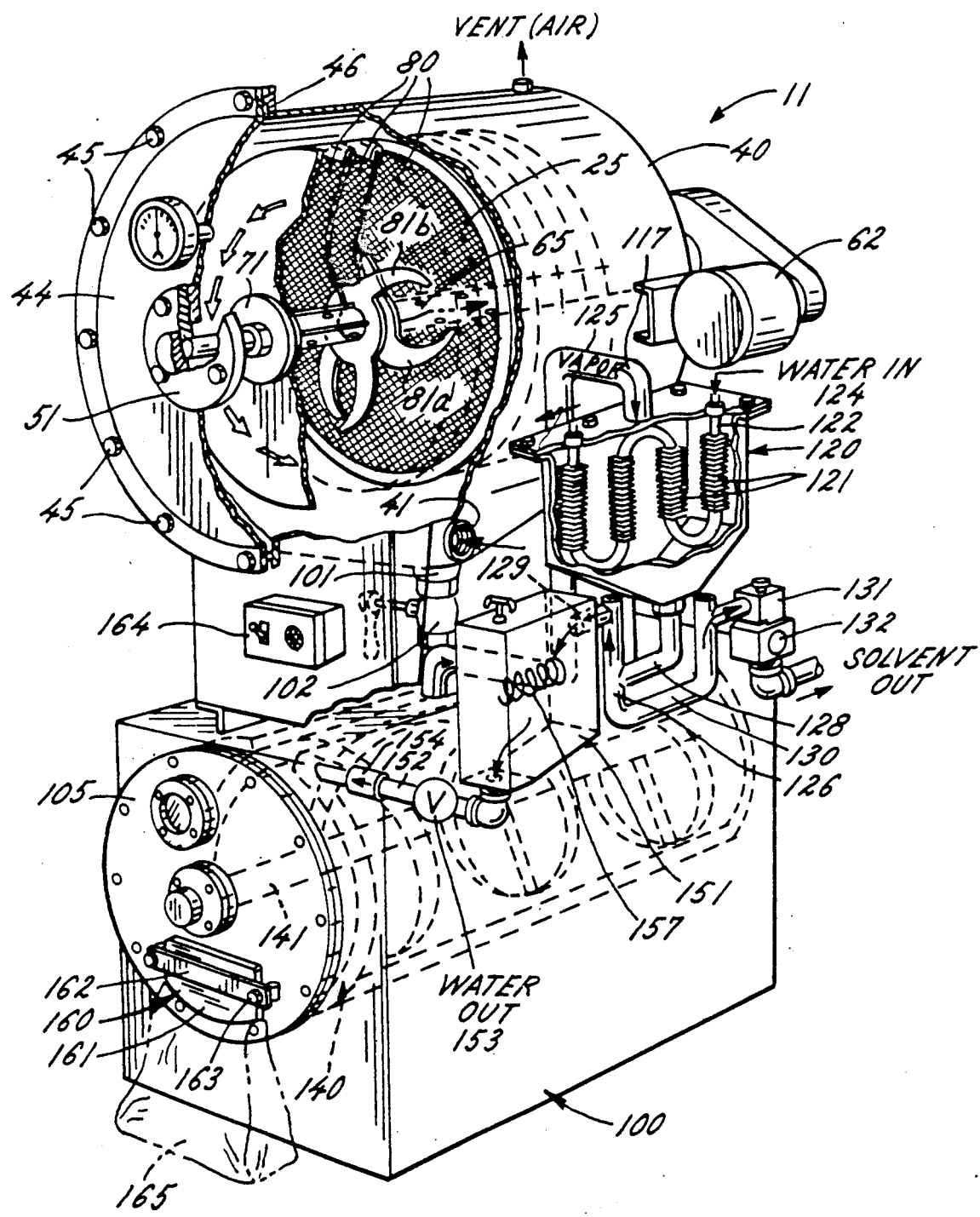
FIG. 3 is a perspective showing, in partial section, showing the front side and opposite end of the filter apparatus and still.
Figure 4:
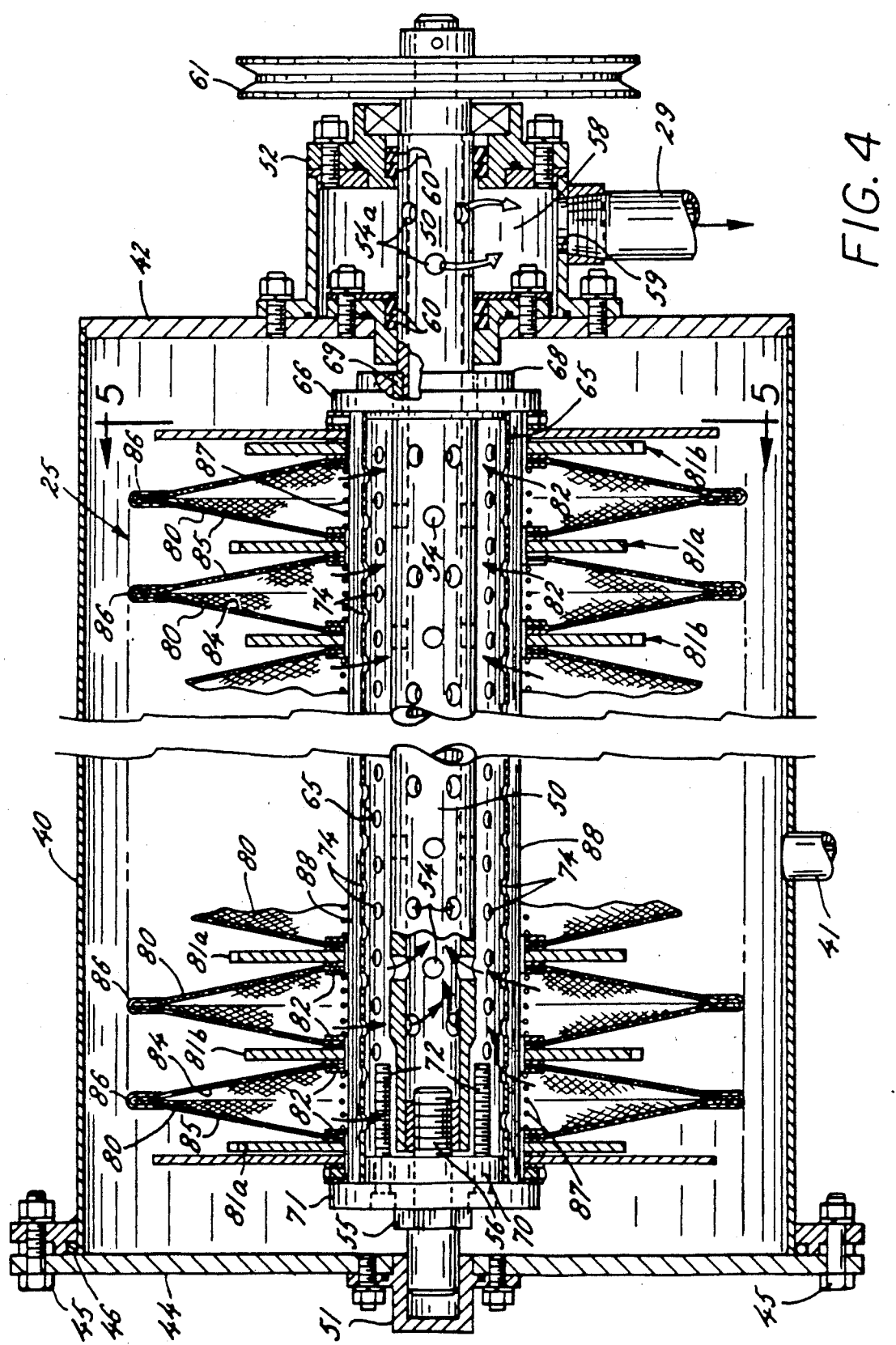
FIG. 4 is an enlarged longitudinal section of the filter apparatus of the illustrated liquid clarification system.

The filter apparatus 25, as best shown in FIGS. 2-4, comprises an outer cylindrical housing 40 having an inlet 41 in the underside thereof coupled to the solvent supply line 26 and a pair of end plates 42, 44 enclosing its opposite ends. One of the end plates 44 is removably secured to the housing 40 by bolts 45 with a suitable seal 46 interposed therebetween to prevent leakage. A hollow filter shaft 50 is rotatably supported between a bearing bracket 51 supported in the end plate 44 and by a sealed bearing assembly 52 supported in the opposite end plate 42. The hollow filter shaft 50 has perforations 54 through its walls and is closed at opposite ends. The filter shaft 50 in this case is closed at its left hand end, as viewed in FIG. 4, by a removable end member 55 having an inner end 56 in threaded engagement with the interior of the hollow shaft 50. The end of the filter shaft 50 supported within the bearing assembly 52 communicates through perforations 54a with an exit chamber 58 within the bearing assembly 52, which in turn defines an outlet 59 of the filter apparatus 25 which is coupled to the supply line 29 to the washer 12. Appropriate seals 60 are provided between the bearing assembly 52 and the filter shaft 50 on opposite sides of the chamber 58. For rotatably driving the filter shaft 50, the filter shaft 50 has a drive pulley 61 mounted on an extension thereof extending outwardly of the bearing assembly 52. The pulley 61 is belt-driven by a drive motor 62 mounted on a front side of the cylindrical housing 40 of the filter apparatus.

A perforated filter tube 65 in this instance is mounted on the filter-shaft for rotation therewith. One end of the filter tube 65 has an enlarged diameter end plate 66, which in turn is removably coupled to a drive plate 68 of the filter shaft 50 by keys 69. The opposite end of the filter tube 65 has an end plate 70 affixed internally thereof, to which is removably secured an enlarged diameter end plate 71 by bolts 72. Perforations 74 in the filter tube 65 communicate with the interior of the filter shaft 50 through the perforations 54 in the filter shaft 50 so that liquid may flow through the tube 65 into the shaft 50 and then into the exit chamber 58 of the bearing assembly 52.

Figure 5:
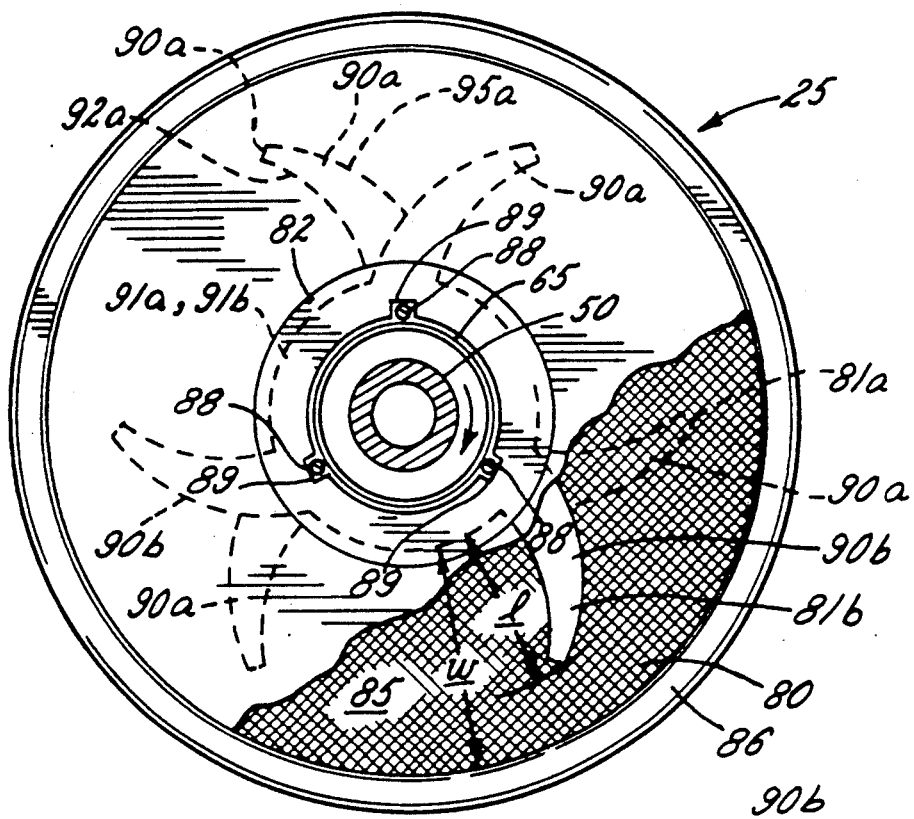
FIG. 5 is a transverse section taken in the plane of line 5—5 in FIG. 4.

For filtering solvent passing through the filter apparatus 25, a series of hollow disc-shaped filters elements 80 are mounted in coaxial alignment on the filter tube 65, each being separated by a spacer 81a or 81b which covers perforations 74 in the filter tube 65 between the adjacent filter elements 80. Gaskets 82 are interposed between the base of each filter element 80 and adjacent spacer 81a or 81b. The filter elements 80 may be of a conventional type, each comprising a relatively rigid, generally v-shaped support structure 84 covered by a fine mesh media such as wire screen or synthetic fabric cloth media such as nylon, polyester, or the like. A spacer 87 may be provided in the base of the support structure 84 for maintaining the v-shape configuration. An outer peripheral rim 86 overlaps and seals together the outer peripheries of filter media 85. For keying the filter elements 80 to the filter tube 65 for rotation with the filter tube 65 and filter shaft 50, a plurality of circumferentially spaced, longitudinal extending rods 88 are secured between the end plates 66, 71 of the filter tube 65. The filter elements 80 and spacers 81a, 81b each are formed with a plurality of circumferentially spaced keyways 89 which receive the respective rods 88 (FIG. 5). It will be understood that the filter elements 80, spacers 81a, 81b and gaskets 82 are removably positionable on the filter tube 65 upon disassembly and removal of the end plate 44 of the filter housing 40, the end member 55 of the filter shaft 50, and the end plate 71 of the filter tube 65. Upon reassembly, the filter elements 80 are clamped between the end plates 66, 71 with the respective spacers 81a 81b and gaskets 82 interposed therebetween.

The filter elements 80 preferably are of the pre-coat type, which may be used with filter-aid materials such as diatomaceous earth. In such case, the fine mesh screen or synthetic fabric filter cloth media 85 may have openings on the order of 40–50 microns so that filter-aid deposited into the solvent flow stream prior to a dry cleaning operation will be deposited onto the outer surfaces of the filter media 85 to establish a filter cake of desired thickness and porosity, as is known in the art. Pulverized activated carbon may also be mixed with a filter-aid.

With the desired filter cake established on the filter elements 80, during a dry cleaning operation, solvent is continuously circulated through the washer 12, button and lint filter 15 and filter apparatus 25, with lint and other foreign matter removed from soiled items in the washer 12 being continuously separated from the solvent flow stream by the filter elements 80. After several dry cleaning operations, the amount of accumulated solids on the filter elements 80 will tend to impede the flow of solvent through the filter elements to the extent that much higher pumping pressures are required. At that time, it is desirable to remove the filter cake and accumulated solids from the filter elements and to reapply it with the filter-aid being dispensed throughout accumulated solids in a manner which again renders the filter cake sufficiently porous to permit passage of the solvent flow stream without excessive pumping pressures. Heretofore, as previously indicated, problems have been incurred in effecting removal of the filter cake and accumulated solids from the filter elements without damage to the fine mesh screen or nylon fabric filter media.

Figure 6:
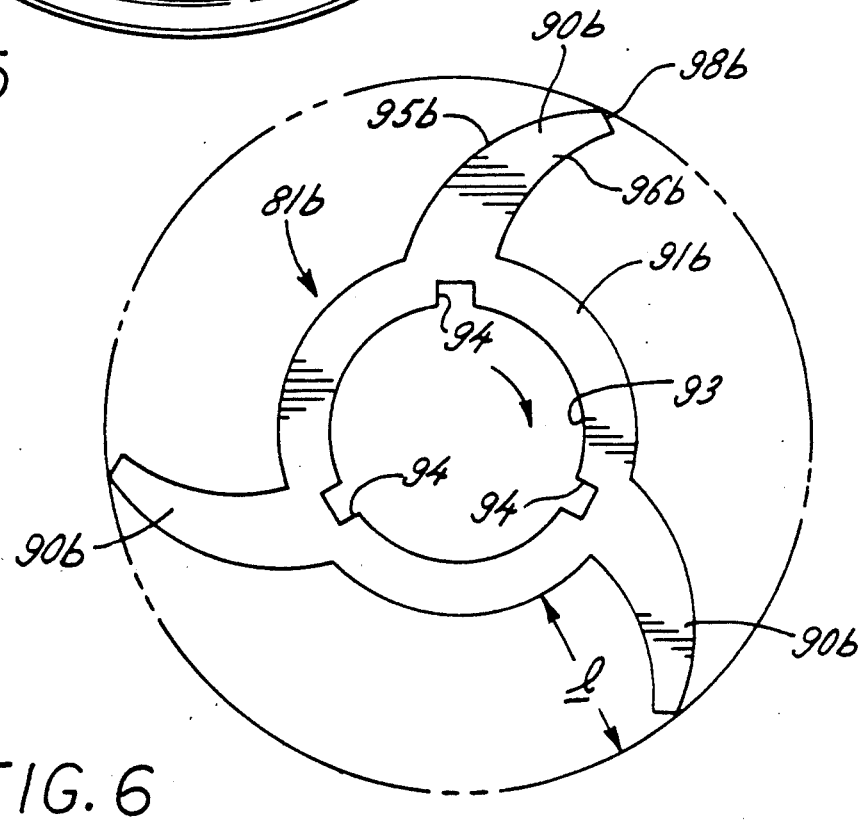
FIG. 6 is an enlarged plan view of one of the turbulence-inducing pellers employed in the filter apparatus.

In accordance with the invention, the filter apparatus includes impeller means which in response to rotation of the filter shaft and the filter elements mounted thereon induce turbulence and agitation of liquid within the filter housing between the filter elements to effect substantially complete removal of the accumulated solids and filter cake from the filter element without damage to the filter media. To this end, in the illustrated embodiment, the spacers 81a, 81b between the respective filter elements 80 are in the form of multi-winged impellers. The spacers or impellers 81a, 81b in this instance each have three circumferentially-spaced, curved wings 90a, 90b, respectively, extending outwardly from an annual mounting hubs 91b, 91b (FIGS. 5-6). The impellers 81a, 81b may be made of metal, plastic or other relatively rigid material and may have a thickness on the order of about ¼ inch. The mounting hubs 91a, 91b each are formed with an internal aperture and circumferentially spaced keyways 94, corresponding to the filter element keyways 89, for the purpose of facilitating mounting on the filter tube 65 and drive rods 88 for rotation therewith.

The impellers 81a, 81b, which preferably are identical in construction, are alternately mounted on the filter tube 65 with the wings 90a, 90b thereof oriented in opposite directions. As shown in FIGS. 3 and 5, the wings 90a of each impeller 81a extend in curvilinear fashion rearwardly with respect to the direction of rotation of the filter tube 65 and shaft 50. Each wing 90a is defined by a leading outwardly and rearwardly curved side 95a and a trailing outwardly and rearwardly curved side 96a, which sides terminate in a substantially square end 98a (FIG. 5). Each wing 90b of the impellars 81b is defined by an outwardly and forwardly curved leading side 96b and an outwardly and forwardly curved trailing side 95b, which sides similarly terminate in a substantially square end 98b (FIG. 6). The wings 90a, 90b preferably extend a radial distance which is at least one-half the radial width of the filter media 85, and preferably extend a radial distance "1" of about two-thirds of the radial width "w" of the filter media.

When it is desired to remove the filter cake and accumulated solids from the filter elements 80, the drive motor 65 may be operated to rotate the filter shaft 50, filter tube 65, and the filter elements 80 and impellers 81a, 81b mounted thereon. Upon such rotation, the turbulence and agitation of the liquid created by the impellar wings 90a, 90b have been found to unexpectedly result in quick and substantially complete dislodgement of filter cake and accumulated solids from the filter elements 80. While the theory of operation is not completely understood, it is believed that in response to rotation of the impellers 81a, 81b the rearwardly curved wings 90a of the impellars 81a tend to direct solvent in an outward direction against the wall of the housing 40, while the forwardly curved wings 90b of the adjacent impellers 81b tend to draw liquid inwardly toward the filter tube 65. As a result, when the filter shaft 50 and tube 65 are rotatably driven, such as at speeds in the range of 250–750 rpm, significant turbulence and agitation of the solvent is created between the filter surfaces of the elements 80 which breaks down, dislodges, and completely removes the accumulated solids and filter cake from the filter element without damage to the filter media 85, even when relatively fine mesh nylon fabrics are employed. Such action is quick and efficient, requiring operation of the drive motor 62 for as little as 15 seconds.

It has been found that the accumulated solids and filter cake may be removed from the filter elements 80, through operation of the drive motor 62, and then reapplied to the filter elements through operation of the pump 20 and recirculation of the solvent through the filter apparatus 25, during the period the washer 12 is in its normal drying cycle of operation, thereby neither disrupting nor delaying operation of the dry cleaning system. The housing 40 for the filter apparatus 25 may have an appropriate inspection window for permitting viewing of the liquid within the housing 40 during any phase of the operation. It will be understood that during and immediately following dislodgement of the filter cake from the filter elements 80 upon rotation of the filter shaft 50, the liquid will be visibly clouded or dark from the suspended solids. Upon recirculation of the liquid and suspended solids through the filter elements 80, such as for a period of 15 minutes, the solvent will become completely clear as the filter-aid and solids within the system are reapplied to the filter elements, signifying that the filter apparatus 25 is ready for resumed use in the dry cleaning operation.

After prolonged use of the dry cleaning system, and repeated removal and reapplication of the filter cake on the filter elements, the amount of solids in the solvent will reach the level that even upon reapplication the filter cake is insufficiently porous to permit adequate passage of the solvent through the filter elements within normal pumping pressure limitations and the activated carbon content of the filter cake becomes ineffective due to the extent of the physical adsorption of dyes and other contaminants. At this time, steps must be taken to remove the solids and other foreign matter from the system to permit operation of the dry cleaning system with clarified solvent and a fresh charge of filter-aid. For this purpose, in the illustrated embodiment, the liquid clarification system 11 includes a still 100 connected to the filter housing 40 by a drain 101 having a selectively operable control valve 102. With the filter housing 40 filled with liquid, and with the control valves 21,32, and 34 all closed so as to isolate the liquid within the housing 40, the filter shaft 50, filter elements 80, and impellers 81a, 81b may be driven to to dislodge the accumulated solids and filter cake from the filter elements 80. The control value 102 for the drain 101 then may be opened to permit drainage of the liquid and suspended solids into the still 100 below the filter apparatus 25. To insure complete removal of solids from the filter elements 80, the filter housing 40 preferably is refilled half full with additional solvent and the filter shaft, filter elements, and impellers again rotated. The additional liquid with the remaining solids is then drained into the still 100 with the previously discharged liquid and solids, leaving the filter apparatus 25 in a substantially clean condition. Solvent with a fresh charge of filter-aid may then be circulated through the filter apparatus 25 to form a new filter cake on the filter elements 80, thereby rendering the filter apparatus 25 ready for continued use in the dry cleaning system. Such solids removal and recharging of the filter apparatus again can be carried out during the normal drying cycle of the dry cleaning system.

In accordance with a further aspect of the invention, and again without interrupting or interfering with the operation of the dry cleaning system, the still 100 of the liquid clarification system 11 is operable for efficient and thorough separation of the solids from the liquid, leaving the solids in dry powder form which may be automatically discharged from the still and be disposed of through normal disposal channels as non-hazardous waste material. In the illustrated embodiment, the still 100 includes a cylindrical tank 105 (FIGS. 7-9) that defines a receptacle for the liquid with the suspended solids discharged through the drain 101 from the filter apparatus 25. For uniformly heating the outer periphery of the cylindrical tank 105 in order to boil and vaporize the liquid contained therein, a steam jacket 106 surrounds substantially the entire outer periphery of the tank so as to define an annular heating chamber 108 about the tank 105. The steam jacket 106 in this case extends from a location on top of the tank immediately adjacent a liquid inlet 109, completely around the underside of the tank 105 to a position immediately adjacent the other side of the inlet 109. A pair of steam inlets 110 are located in the top of the jacket 106 on opposite sides of the liquid inlet 109 and a single steam and condensate outlet 111 is located in the bottom of the jacket 106. Steam introduced into the inlets 110 flows in opposite circumferential directions about the tank 105 so as to provide substantially uniform heating of the tank 105. A steam supply line 112 coupled to the inlets 110 in this instance may be selectively connected to a low-pressure/temperature steam source 114, or alternatively, to a high-pressure/temperature steam source 115 through respective control valves 116, 118. The low-pressure/temperature steam source 114 normally preferably is utilized for boiling and vaporizing liquid within the tank 105, without excessive foaming, until only a wet sludge of solids remains the the tank 110. At that time, the high-pressure/temperature steam source 116 may be supplied to the steam jacket to expedite removal of remaining solvents in the sludge. Steam discharging from the outlet 111 may be returned to the steam boiler by a return line.

Vapors and steam generated within the tank 105 from the solvent and from water removed from items in the washer 12 during the dry cleaning operation discharge through an appropriate outlet in the top of the tank 105, which is coupled by means of a pipe 117 to a condenser 120 wherein the solvent vapors and steam are condensed (FIG. 3). The condenser 120 includes series of cooling fins 121 connected to a cold water line 122 having an inlet 124 and an outlet 125. In order to separate condensed solvent from condensed steam (i.e., water), the condenser 120 is connected to a separator 126 which utilizes a difference in specific gravities of condensed liquids. A mixture of dry cleaning solvent and water enters the separator 126 through an inlet 128. Since the water is lighter than the solvent, the water will flow through a water outlet line 129 communicating with the topside of the separator inlet 128 and the solvent will discharge through a solvent outlet line 130 communicating with an underside of the separator inlet 128. The solvent outlet line 130 directs condensed solvent back to the dry cleaning machine through a flow sensor 131 which may have a viewing window 132 (FIG. 3).

In carrying out the invention, the tank 105 of the still 100 has an auger 140 for enhancing thorough heating and vaporization of the liquid contents within tank 105, drying of the wet sludge when most of the liquid is vaporized, breaking down and pulverizing clumps of solids that remain, and discharging of the dried and pulverized solids from the tank. The auger 140 in this instance has a central rotary shaft 141 with a plurality of radial arms 142 that support a helical auger blade 144 in closely adjacent relation to the inside wall of the cylindrical tank 105. The shaft 141 is supported for relative rotary movement in the tank 105 by bushings 146 and has an outwardly extending end that carries a pulley 148 coupled to a drive motor 149 (FIG. 2). The auger 140 may be driven through an appropriate timer 150 in alternate directions such that the auger blade 144 moves sludge within the tank 105 first in a direction against one end wall of the tank and then in the opposite direction against the opposite end wall. Such reciprocating movement of sludge within the tank 105 tends to continuously mix the contents within the tank for uniform heating and break down and pulverize any clumps of sludge that are formed during drying, and thus, enhance the complete vaporization of contained solvents.

In keeping with a further aspect of the invention, the auger 140 includes diametrically opposed mixer blades 155 mounted on the outer periphery of the auger arms 142 in longitudinally extending fashion. The mixer blades 155 each have generally rounded sides 155a, 155b (FIG. 9) which may be formed by a pair of welded pipe sections. Upon rotation of the auger 140, the mixer blades 155 operate in paddle fashion, moving circumferentially about the internal cylindrical wall of the tank 105. Upon rotation of the auger in one direction, one side 155a of the blade 155 tends to lift sludge from the bottom of the tank 105 and move it up one side of the tank as mixer blade moves upwardly along the wall. Upon reversal of auger rotation, the opposite side 155b of the mixer blades 155 will lift sludge from the bottom of the tank 105 and move it up the opposite side of the tank. The rounded configuration of the sides 155a, 155b of the blades 155 in cooperation with the internal cylindrical wall of the tank 105 will lift liquid as well as solids upwardly along the side wall of the tank for enhanced heating during early stages of distillation. As the sludge becomes drier through vaporization of the liquid, the rounded sides of the blades tend to force lumps or chunks of sludge in crushing fashion against the cylindrical wall of the tank to free solvent held therein, and ultimately, cause the dried solids to become granular or powder-like in form. In order that the mixing blades 155 do not prevent the axial movement of sludge within the tank, the blades 155 preferably are segmented so as not to extend the entire length of the tank, thereby permitting unencumbered action of the auger blade on the sludge at various locations along the length of the tank.

The auger 140 preferably is alternatively driven in forward and reverse directions throughout the distillation process. Initially, as indicated previously, to prevent excessive boiling and foaming of liquids within the tank, steam preferably is supplied to the steam jacket 106 from the low-pressure/temperature source 114. When most of the liquid in the tank has been vaporized, the low-pressure/temperature steam source 114 may be turned off and the high-pressure/temperature steam source 115 turned on to expedite vaporization of the remaining solvent in the sludge. Preferably, operation of the low and high steam pressure valves 116, 118 is automatically controlled by the solvent condensate flow sensor 131 included in the solvent outlet line 130 from the separator 126. Through an appropriate control, if the flow of condensed solvent through the flow sensor 131 is above a predetermined level, the low-pressure value 116 may be actuated. When solvent flow through the flow sensor 131 falls below the predetermined level, a signal may be generated to close the low-pressure control valve 116 and open the high-pressure control valve 118.

Although the separator 126 substantially separates the condensed solvent and water discharging from the condenser 120, the water discharging through the outlet line 129 may include sufficiently high amounts of solvent as to render the liquid toxic, and in such case, this has required disposal of the water as a hazardous waste material. If steam is introduced into the still during final stages of the distillation, commonly referred to as a steam sweep, in order to facilitate driving off remaining retained solvents in the sludge, the amount of water discharging from the separator is greatly increased, as is the problem of disposing of the water if toxic.

In accordance with a further aspect of the invention, water discharging from the separator 126 is directed to a water holding tank 151, from which is selectively directed back into the still 100 in a substantially closed loop cycle, in order to generate steam within the still 100 for the purpose of sweeping or driving off the remaining retained solvents in the sludge during final stages of distillation. The water outlet line 129 from the separater 126 in this case connects with an upper end of the water holding tank 151 so is to permit filling thereof by gravity flow. The water holding tank 151, which preferably may be sufficiently large for containing from between 10 to 15 gallons of water, has a discharge line 152 connected to the tank 105 of the still 100 through a selectively operable control valve 153 and a check valve 154. The holding tank 151 in this instance includes a heating coil 157 for heating water introduced into the holding tank 151 from the separator 126, prior to direction into the still 100.

During operation of the still 100, the control valve 153 normally is closed and the holding tank 151 contains a predetermined quantity of water, such as on the order of 10 gallons. During such time, water within the still derived from moisture removed from dry cleaned garments is vaporized during the distillation process, together with solvents, and upon condensing and separation, as referred to above, the water is directed into and retained by the holding tank 151. As the amount of solvent within the still is reduced during the final stages of distillation, the control valve 153 is opened, either manually or automatically based upon a signal from the solvent flow sensor 131 in response to the solvent flow being reduced below a predetermined level. Upon opening of the control valve 153, communication between the water holding tank 151 and the still 100 through the line 152 is controlled only by the check valve 154. When the weight of water within the holding tank 151 overcomes the pressure within the tank 105 of the still 100, which will occur as the amount of liquids being vaporized within the still 100 reduces, the check valve 154 will open, permitting the contents of the water holding tank 151 to be introduced into the still tank 105 through the line 152. Water introduced into the still will quickly vaporize, causing steam to permeate the sludge to facilitate discharge and vaporization of solvents retained in the sludge. Upon emptying of the contents of the water holding tank 151 into the still and the increase of liquid vaporization within the still 100, the pressure within the still tank 105 will be greater than the pressure within the holding tank 151, causing the check valve 154 to close. Water and solvent vapors generated within the still will continue to discharge through the outlet line 117 to the condenser 120, and the separator 126 will subtantially separate the condensed water and solvent, with the water being directed to the holding tank 151 and the solvent being directed through the solvent outlet line 130 and the flow sensor 131. Since during such steam sweep cycle, the volume of condensed water is relatively large in comparison to the volume of condensed solvent, the water returning to the holding tank will have much smaller amounts of solvent than during the earlier operation of the still when the discharge from the separator was primarily solvent. As water accumulates in the holding tank 151 and as the amount of liquid being vaporized within the still reduces, the weight of the water in the holding tank 151 again will overcome the pressure within the still tank 105, causing the check valve 154 to again open and allowing the contents of the water holding tank 151 to again be directed into the still for another steam sweep cycle. After such repeated steam sweep cycles, substantially all of the solvent will be removed from the solids within the still, such that the liquid discharging from the condensor 120 is substantially free of solvent.

When there is no longer be a flow of solvent through the solvent flow sensor 131, such condition maybe sensed, and in response thereto, the control valve 153 may be closed. The liquid remaining in the still, which then is essentially water, will then be evaporated, condensed, and returned to the water holding tank, leaving the water holding tank in a substantially full condition. Throughout the steam sweep cycle, the auger may be continuously operated in its alternately directions of movement, to enhance drying and breakdown of the solids into granular powder-like form substantially free of retained solvent.

In order to reduce the odor of solvent in the dried solids, means are provided for introducing compressed air into the tank at the end of the distillation process. For this purpose, a plurality of pressurized air inlet ports 158 are provided in the underside of the tank 105 which may be selectively coupled to an appropriate pressurized air source, or alternatively to a source of live steam. Each inlet port 158 preferably includes a ceramic filter which prevents the escape of liquid and sludge from the tank, but permits the passage of pressurized air therethrough. By introducing pressurized air into the tank 105 through the inlet ports 158 at a rate of between 50-100 cfm, the air will lift and fluidize the dried solids, forcing any remaining solvent vapors to be expelled into the condenser 120.

To facilitate disposal of dried solids within the still following completion of the distillation cycle, one end of the tank 105 has a discharge port 160 (FIG. 3) having a removable door 161, which is normally secured in place by a pivotal bracket 162 secured by a bolt 163. Upon removal of the bolt and pivoting of the bracket 162, the door may be removed. Upon selected operation of the auger in a forward direction, such as upon actuation of manual switch 164, the auger blade 144 will automatically expel the dried solids into a container or bag 164 disposed at the discharge port 160. When all of the waste is expelled from the tank 105, the auger 140 may be turned off, the door 161 replaced, and the container 165 with the dried solids, substantially free of retained solvent, may be disposed of through normal channels as a non-hazardous waste.

It will be appreciated that since the steam sweep cycle, referred to above, will affect removal of substantially all solvents from the solids within the still, upon closure of the control valve 153 for the water holding tank 100 following the final steam sweep cycle, the water remaining in the still 151 is substantially free of solvent. Hence, to conserve energy, it is not necessary that the solids be completely dried of all liquid at the end of the last steam sweep cycle. Instead, the solids need only be dried sufficiently to facilitate their removal from the still and subsequent handling and disposal. Preferably, the solids are dried to a substantially dry condition, containing about the same amount of water that is included in the solvent from dry cleaning operation at the outset of the distillation process, which typically is about ½ gallon. In that event, the level of water within the holding tank 151 is substantially the same following completion of the steam sweep operation, as it is at the beginning. It will be understood that additional water maybe added to the holding tank 151 as necessary prior to start-up of the steam sweep cycle, such as by control of an appropriate float valve. In the event excessive water exists at the end of the steam sweep cycle, since the water is substantially free of solvent, it may be disposed of as a non-hazardous waste material by simple draining. It will be understood that while in the illustrated embodiment liquid flow from the condenser to the holding tank and still is by gravity, alternatively, appropriate pumps may be employed.

While the filter apparatus of the invention has been described in connection with the use of filter-aid material such as diatomaceous earth, it will be understood that other types of filter-aids could be used. For example, a cellulose filter-aid could be employed, such as the type sold by the Dicalite Division of Grefco Inc. under the trademark Solka-Floc. Alternatively, the filter apparatus for the present invention could be used as a powderless filter, and in such case, lint from garments being dry cleaned will have a tendency to obstruct the filter media to obtain clarification of the liquid. In such operating mode, cellulose filter aid may be introduced with each load of dry cleaning to speed up the clarification, particularly with fabrics which do not tend to release lint. It will be appreciated that when cellulose filter aid material is used, the dried solids recovered from the still following distillation can be easily incinerated.

Finally, under some operating conditions, the filter apparatus of the present invention could be used without any filter-aid. Since the filter apparatus impellers effect substantially complete removal of solids accumulated on the filter elements, without damage or significant wear to the filter media, more delicate finer mesh filter media could be employed than conventionally used in dry cleaning filter apparatus. For example, use of a fine cloth filter media, having a porosity of about ten microns would eliminate the need for filter aid entirely. In such case, in order to prolong the use time of the filter media before removal of solids, it is preferred that greater surface areas be employed for the filter media than when larger porosity screens are used with filter-aid.

From the foregoing, it can be seen that the filter apparatus of the liquid clarification system of the invention is adapted to effect complete removal of accumulated solids and filter-aid from the filter elements without damage to the filter media. The liquid clarification system further is adapted to permit automatic, substantially complete separation of solids and impurities from the solvent, permitting reuse of the solvent and leaving the removed solids in dry powder-like form, substantially free of retained solvents, which may be disposed of through normal channels as a non-hazardous waste. While the liquid clarification system of the present invention has been described in connection with use of a dry cleaning system, it will be understood that it may be used in other filtration and liquid clarification applications.

I claim as my invention:
1. A liquid clarification system comprising:
a still including a cylindrical tank having end walls at opposite ends thereof, said tank having an inlet through which unclarified liquid having suspended solids is introduced,
means for heating said tank to a temperature in excess of the boiling temperature of the introduced liquid for vaporizing the liquid while leaving said solids within the tank,
condensing means for receiving vapors from liquid from within the tank and for condensing said vapors to liquid form,
helical blade means operable upon rotation in one rotary direction for moving the contents within the tank in one axial direction and forcing the contents against an end wall at one end, said helical blade means being operable upon rotation in an opposite rotary direction for moving the contents within the tank in an opposite axial direction and forcing said contents against an end wall at the other end of said tank, means for alternately rotating said helical blade means in said one direction for moving the contents in said tank in said one axial direction and forcing said contents against the end wall at said one end and then rotating said helical blade means in an opposite rotary direction for moving the contents within the tank in the opposite axial direction and forcing the contents against the end wall at the other end of the tank for enhancing heating and vaporization of the liquid and drying and mixing of the remaining solids, said heating means including a steam jacket about an outer cylindrical surface of said tank, and means for supplying low-pressure and temperature steam to said steam jacket when the liquid content within the tank exceeds a predetermined level, and means for supplying higher pressure and temperature steam to said steam jacket when the liquid content within said tank is reduced below said predetermined level.

2. A liquid clarification system comprising:

a still including a cylindrical tank having end walls at opposite ends thereof, said tank having an inlet through which unclarified liquid having suspended solids is introduced, means for heating said tank to a temperature in excess of the boiling temperature of the introduced liquid for vaporizing the liquid while leaving said solids within the tank, condensing means for receiving vapors from liquid within the tank and for condensing said vapors to liquid form, helical blade means having one end adjacent one of said tank end walls and being operable upon rotation in one rotary direction for moving the contents within the tank in an axial direction and forcing the contents against said one end wall of said tank, and longitudinally extending blade means adjacent said one end of said helical blade means and said one tank end wall and rotatable with said helical blade means for engaging, lifting and mixing the contents within the tank that are forced against the end wall by said helical blade means to enhance heating and vaporization of the liquid and drying and mixing of the remaining solids.

3. A liquid clarification system comprising:

a still including a cylindrical tank having end walls at opposite ends thereof, said tank having an inlet through which unclarified liquids in the form of solvent and water having suspended solids is introduced, means for heating said tank to a temperature in excess of the boiling temperatures of the introduced liquids for vaporizing a substantial portion of the liquids while leaving said solids within the tank, condensing means located outside said tank for receiving vapors from liquids within the tank and for condensing said vapors to liquid form, means for receiving condensed liquids from said condensing means and for separating condensed water from condensed liquid solvent, helical blade means operable upon rotation in one rotary direction for moving the contents within the tank in one axial direction and forcing the contents against an end wall at one end of said tank, said helical blade means being operable upon rotation in an opposite rotary direction for moving the contents within the tank in an opposite axial direction and forcing said contents against an end wall at the other end of said tank, means for alternately rotating said helical blade means in said one direction for moving the contents in said tank in said one axial direction and forcing said contents against the end wall at said one end and then rotating said helical blade means in an opposite rotary direction for moving the contents within the tank in the opposite axial direction and forcing the contents against the end wall at the other end of the tank for enhancing heating and vaporization of the liquid and drying and mixing of the remaining solids, and means for directing water from said separating means into said tank after said substantial portion of liquids have been vaporized and removed from the tank for creating steam within the tank to enhance further vaporization and removal of solvent remaining in the solids with in the tank.

4. The liquid clarification system of claim 3 including holding means for receiving condensed water from said separating means, means for sensing the content of solvent within the tank, and means for directing water from said holding means into said tank when the solvent content is reduced below a predetermined level.

5. The liquid clarification system of claim 3 including holding means for receiving condensed water from said separating means, said water directing means includes a conduit connecting said water holding means to said tank, said conduit having a selectively operable control valve for opening and closing said conduit and a check valve for opening and closing said conduit and a check valve which permits water flow through said conduit when said control valve is open and the water pressure in said holding means is greater than the vapor pressure within said tank.

6. The liquid clarification system of claim 3 including means for alternately lifting the contents within the tank against opposite cylindrical sides of the tank as the contents are forced against said end walls by said helical blade means.

7. The liquid clarification system of claim 6 in which said helical blade means is an auger rotatably supported within said tank, said auger including a central shaft mounted for rotational movement relative to said tank and said means for alternately lifting the contents within the tank includes at least one mixing blade mounted on said auger shaft in longitudinally extending relation to the internal cylindrical wall of said tank.

8. The liquid clarification system of claim 7 in which said mixing blade is defined by a pair of generally rounded sides.

9. The liquid clarification system of claim 7 in which said auger includes two longitudinally extending mixing blades disposed in diametrically opposed relation on said auger.

10. The liquid clarification system of claim 3 in which said helical blade means is an auger rotatably supported within said tank.

11. The liquid clarification system of claim 10 in which said auger includes a central shaft mounted for rotational movement in said tank, and a helical auger blade affixed to said auger shaft and disposed for movement in closely adjacent relation to an internal cylindrical wall of said tank.

12. The liquid clarification system of claim 10 in which said tank has a discharge port at one end, a removable door normally closing said discharge port, and said auger being operable upon removable of said door for automatically discharging through said port solids remaining in said tank following vaporization of the liquid.

13. The liquid clarification system of claim 3 in which said heating means includes a steam jacket about an outer cylindrical surface of said tank, and means for circulating steam through said jacket.

14. The liquid clarification system of claim 13 including means for directing steam downwardly simultaneously about opposite outer cylindrical sides of said tank.

* * * * *